United States Patent
Cho

(10) Patent No.: US 11,054,029 B2
(45) Date of Patent: Jul. 6, 2021

(54) SHIFTING ACTUATOR FOR TRANSMISSION

(71) Applicants: HYUNDAI MOTOR COMPANY, Seoul (KR); KIA MOTORS CORPORATION, Seoul (KR)

(72) Inventor: Hang Chul Cho, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 102 days.

(21) Appl. No.: 16/655,456

(22) Filed: Oct. 17, 2019

(65) Prior Publication Data

US 2021/0010590 A1  Jan. 14, 2021

(30) Foreign Application Priority Data

Jul. 8, 2019  (KR) ........................ 10-2019-0081787

(51) Int. Cl.

| F16H 63/16 | (2006.01) |
|---|---|
| F16H 25/20 | (2006.01) |
| F16H 63/32 | (2006.01) |
| F16H 63/34 | (2006.01) |
| F16H 61/26 | (2006.01) |
| B60T 1/00 | (2006.01) |
| F16H 63/30 | (2006.01) |
| F16H 61/28 | (2006.01) |

(52) U.S. Cl.
CPC ............ *F16H 63/16* (2013.01); *F16H 25/20* (2013.01); *F16H 61/26* (2013.01); *F16H 63/32* (2013.01); *F16H 63/3466* (2013.01); *B60T 1/005* (2013.01); *F16H 2025/204* (2013.01); *F16H 2025/2075* (2013.01); *F16H 2061/2884* (2013.01); *F16H 2063/3063* (2013.01); *F16H 2063/322* (2013.01)

(58) Field of Classification Search
CPC ....... F16H 2063/3063; F16H 2063/322; F16H 2061/2884
See application file for complete search history.

(56) References Cited

U.S. PATENT DOCUMENTS

| 4,449,416 | A | * | 5/1984 | Huitema | ............... F16H 63/304 192/103 R |
|---|---|---|---|---|---|
| 4,498,350 | A | * | 2/1985 | Ross | ..................... F16H 63/304 192/109 A |
| 5,068,583 | A | * | 11/1991 | Gresham | ................. F16H 59/70 318/266 |
| 5,249,474 | A | * | 10/1993 | Gregory | ................. B60K 17/28 74/15.66 |

(Continued)

FOREIGN PATENT DOCUMENTS

KR  10-0727567  6/2007

*Primary Examiner* — William Kelleher
*Assistant Examiner* — Gregory T Prather
(74) *Attorney, Agent, or Firm* — Brinks Gilson & Lione

(57) ABSTRACT

A shifting actuator for a transmission includes: a screw shaft; a screw nut which threadedly engages the screw shaft and linearly moves along the screw shaft; a guide for guiding movement of the screw nut; a control finger integrally formed with the screw nut; and a first slider and a second slider, which are disposed parallel to each other and adapted to be selected by the control finger so as to be linearly slidable in an axial direction parallel to a longitudinal direction of the screw shaft.

6 Claims, 4 Drawing Sheets

(56) References Cited

U.S. PATENT DOCUMENTS

| | | | | |
|---|---|---|---|---|
| 5,460,060 A * | 10/1995 | Nellums | F16H 63/304 192/109 A | |
| 5,517,876 A * | 5/1996 | Genise | F16H 63/304 74/473.24 | |
| 5,689,997 A * | 11/1997 | Schaller | F16H 61/32 74/335 | |
| 6,082,514 A * | 7/2000 | Averill | F16D 11/10 180/233 | |
| 9,989,151 B2 * | 6/2018 | Imafuku | F16H 63/04 | |
| 10,472,092 B2 * | 11/2019 | Langworthy | B64D 47/08 | |
| 2003/0199356 A1 * | 10/2003 | Biallas | F16H 63/3043 475/154 | |
| 2005/0284247 A1 * | 12/2005 | Sharma | F16H 63/304 74/473.1 | |
| 2006/0096402 A1 * | 5/2006 | Choi | F16H 63/18 74/473.12 | |
| 2006/0169084 A1 * | 8/2006 | Meaney | H02K 7/116 74/473.1 | |
| 2006/0191366 A1 * | 8/2006 | Kapaan | F16H 63/304 74/412 R | |
| 2010/0071497 A1 * | 3/2010 | Reisch | F16H 61/32 74/473.12 | |
| 2010/0242642 A1 * | 9/2010 | Ganter | F16H 25/20 74/89.23 | |
| 2010/0294070 A1 * | 11/2010 | Akashi | F16H 61/28 74/473.36 | |
| 2012/0017716 A1 * | 1/2012 | Neelakantan | F16H 63/18 74/473.11 | |
| 2012/0318089 A1 * | 12/2012 | Uemoto | F16H 61/32 74/473.12 | |
| 2013/0199885 A1 * | 8/2013 | Quehenberger | F16D 13/04 192/84.1 | |
| 2014/0041468 A1 * | 2/2014 | Yukitake | H02K 7/1085 74/63 | |
| 2015/0075308 A1 * | 3/2015 | Enami | F16H 61/28 74/335 | |
| 2016/0096429 A1 * | 4/2016 | Imafuku | B60K 17/344 180/233 | |
| 2017/0045125 A1 * | 2/2017 | Kawame | F16H 25/22 | |
| 2017/0130838 A1 * | 5/2017 | Imafuku | F16H 63/30 | |
| 2017/0146120 A1 * | 5/2017 | Kang | F16H 61/688 | |
| 2017/0152947 A1 * | 6/2017 | Imafuku | B60K 17/34 | |
| 2018/0017158 A1 * | 1/2018 | Lee | H01F 7/1615 | |
| 2019/0128417 A1 * | 5/2019 | Schulte | F16H 63/30 | |
| 2019/0264753 A1 * | 8/2019 | Creech | F16H 63/32 | |

* cited by examiner

FIG. 4A "PRIOR ART"     FIG. 4B
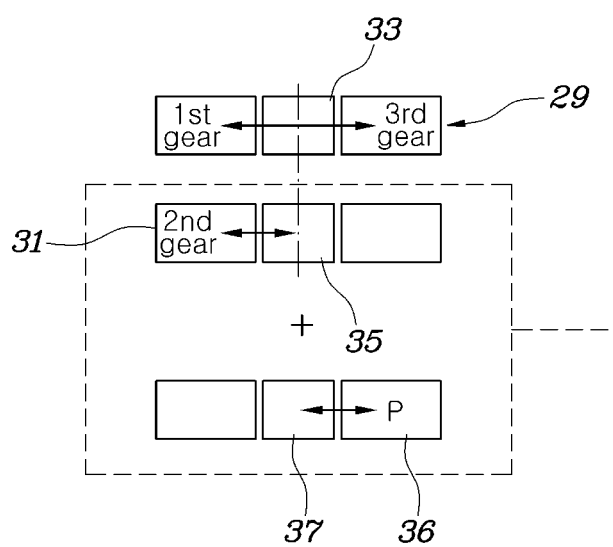
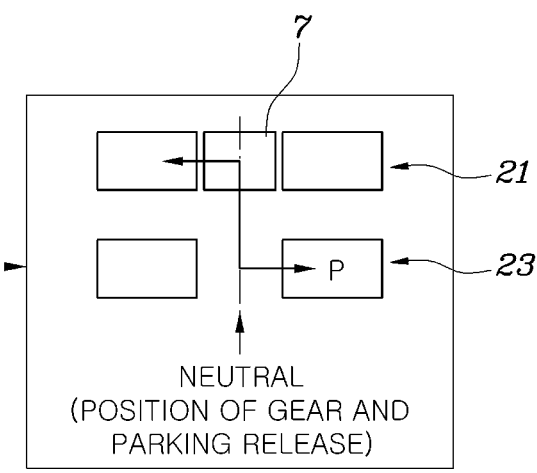

SHIFTING ACTUATOR FOR TRANSMISSION

CROSS-REFERENCE TO RELATED APPLICATION

This application claims priority to and the benefit of Korean Patent Application No. 10-2019-0081787, filed on Jul. 8, 2019, the entire contents of which are incorporated herein by reference.

FIELD

The present disclosure relates to a shifting actuator for a vehicle to manipulate a synchromesh-type transmission.

BACKGROUND

The statements in this section merely provide background information related to the present disclosure and may not constitute prior art.

Electric vehicles, which are recently being developed, started to adopt multistage transmissions for the purpose of cost reduction. Such a transmission mechanism, which is mainly considered as a transmission for electric vehicles, is a synchromesh-type transmission mechanism. This synchromesh-type transmission mechanism is conventionally used in manual transmissions so as to achieve high efficiency of power transmission using a simple construction.

The synchromesh-type transmission mechanism is designed to perform shifting by linearly moving a sleeve so as to be engaged with a shift gear.

A transmission is provided with a parking function for preventing rotation of an output shaft of the transmission in a parked state. To this end, a conventional transmission is constructed so as to include an additional device adapted to manipulate a parking device in addition to a shifting manipulation mechanism for driving a sleeve.

The details described as the background art are intended merely for the purpose of promoting an understanding of the background of the present disclosure and should not be construed as an acknowledgment of the prior art that is previously known to those of ordinary skill in the art.

SUMMARY

The present disclosure provides a shifting actuator for a transmission, which is constructed so as to have a more simple and compact structure and able to improve fuel efficiency and electric efficiency of a vehicle and also to improve merchantability.

In one form of the present disclosure, a shifting actuator for a transmission may include: a rotatable screw shaft; a screw nut configured to threadedly engage the screw shaft and linearly move along the rotatable screw shaft; a guide configured to guide the screw nut; a control finger integrally formed with the screw nut; and a first slider and a second slider, which are disposed parallel to each other and adapted to be selected by the control finger so as to be linearly slidable in an axial direction parallel to a longitudinal direction of the rotatable screw shaft. In particular, the screw nut is provided with a guide hole in which the guide is disposed, and of the guide hole defines two linear zones which are spaced apart from each other and parallel to each other.

The two linear zones of the guide hole formed in the screw nut may be out of alignment with each other in the axial direction and may be connected to each other at adjacent ends thereof via a connecting zone.

The connecting zone may be perpendicularly connected to adjacent ends of the two linear zones, and the two linear zones and the connecting zone of the guide hole may be configured to have a single continuous line shape having the same width such that, when the screw nut is moved relative to the guide in the state in which the guide is disposed in the guide hole, movement of the screw nut is guided by the guide.

The first slider may be integrally provided with a first lug, and the second slider may be integrally provided with a second lug. In particular, since the connecting zone of the guide hole is guided by the guide, as the screw nut is rotated, the control finger is shifted between a first state in which the control finger is engaged with the first lug and a second state in which the control finger is engaged with the second lug.

The rotatable screw shaft may be connected at one end thereof to a motor so as to receive a rotating force therefrom.

In one form, the first slider may be connected to a shift fork for shifting manipulation, and the second slider may be connected to a parking device for realizing a parking function.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4A is a view illustrating a conventional shifting manipulation mechanism; and FIG. 4B is a view illustrating a parking device manipulation mechanism with the actuator according to one form of the present disclosure.

Figure 1:
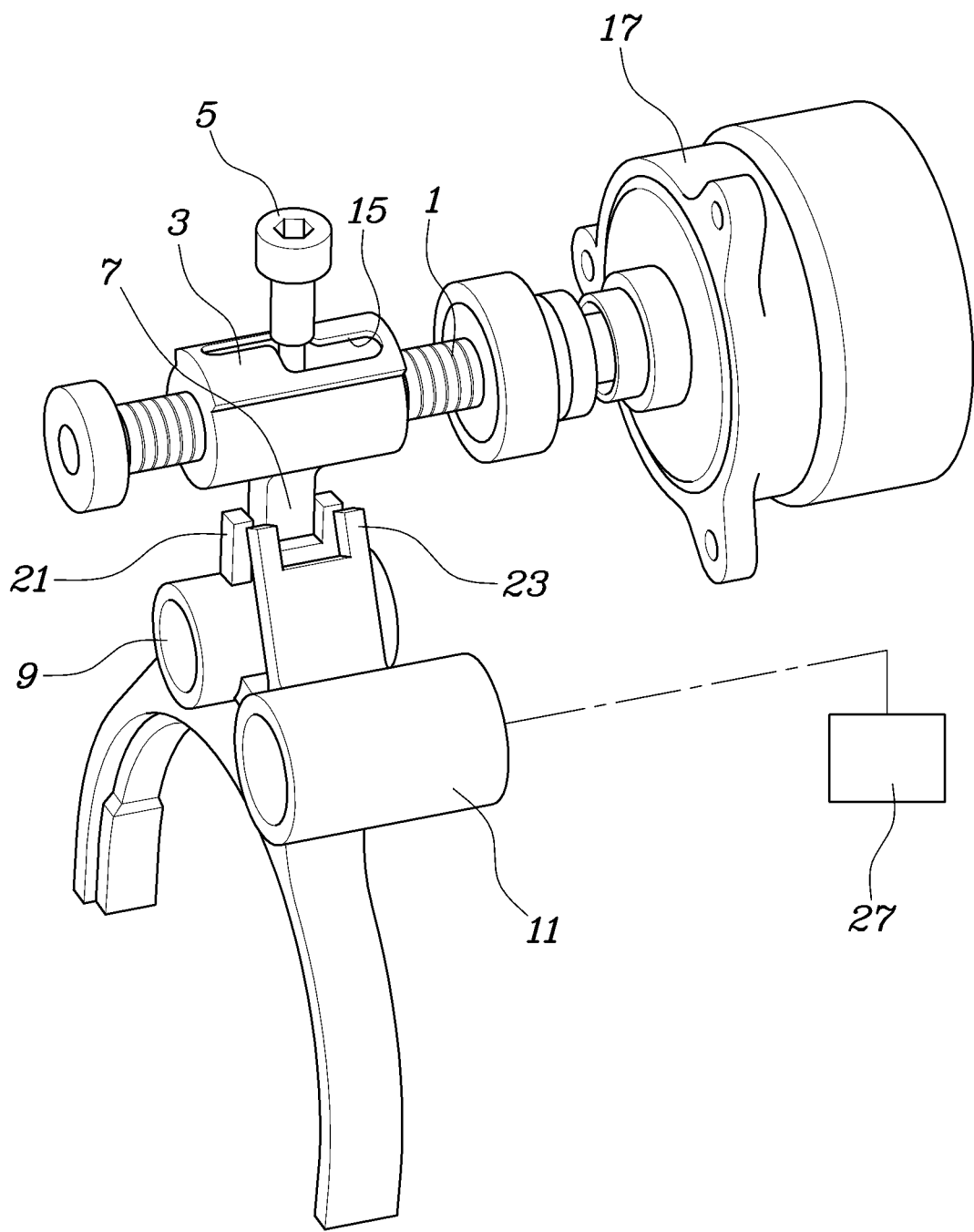
FIG. 1 is a perspective view of a shifting actuator for a transmission according to one form of present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
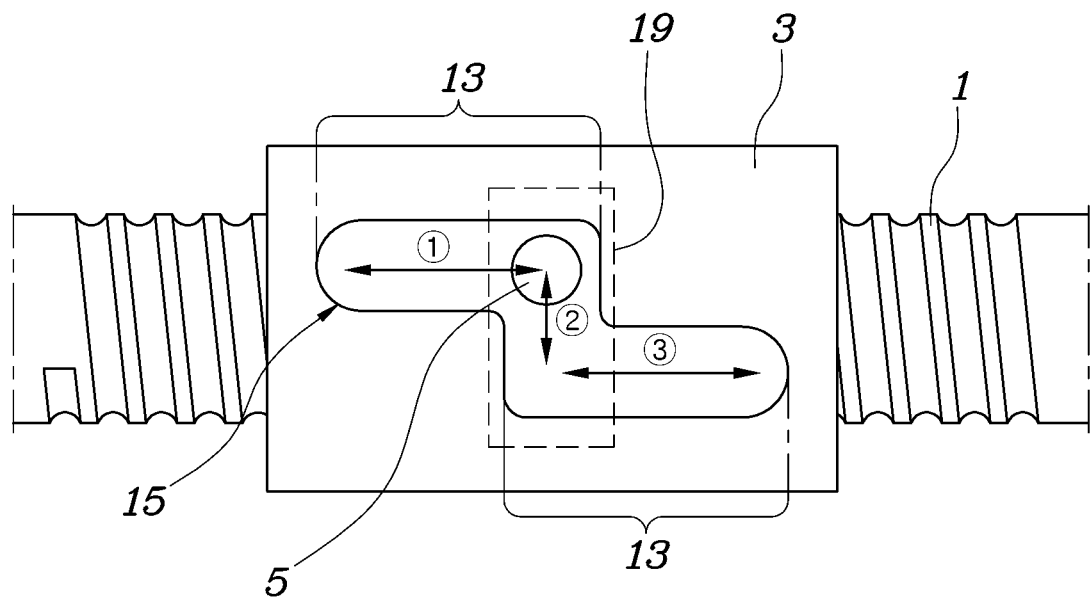
FIG. 2 is a plan view illustrating a screw shaft, a screw nut and a guide of FIG. 1.
Figure 3:
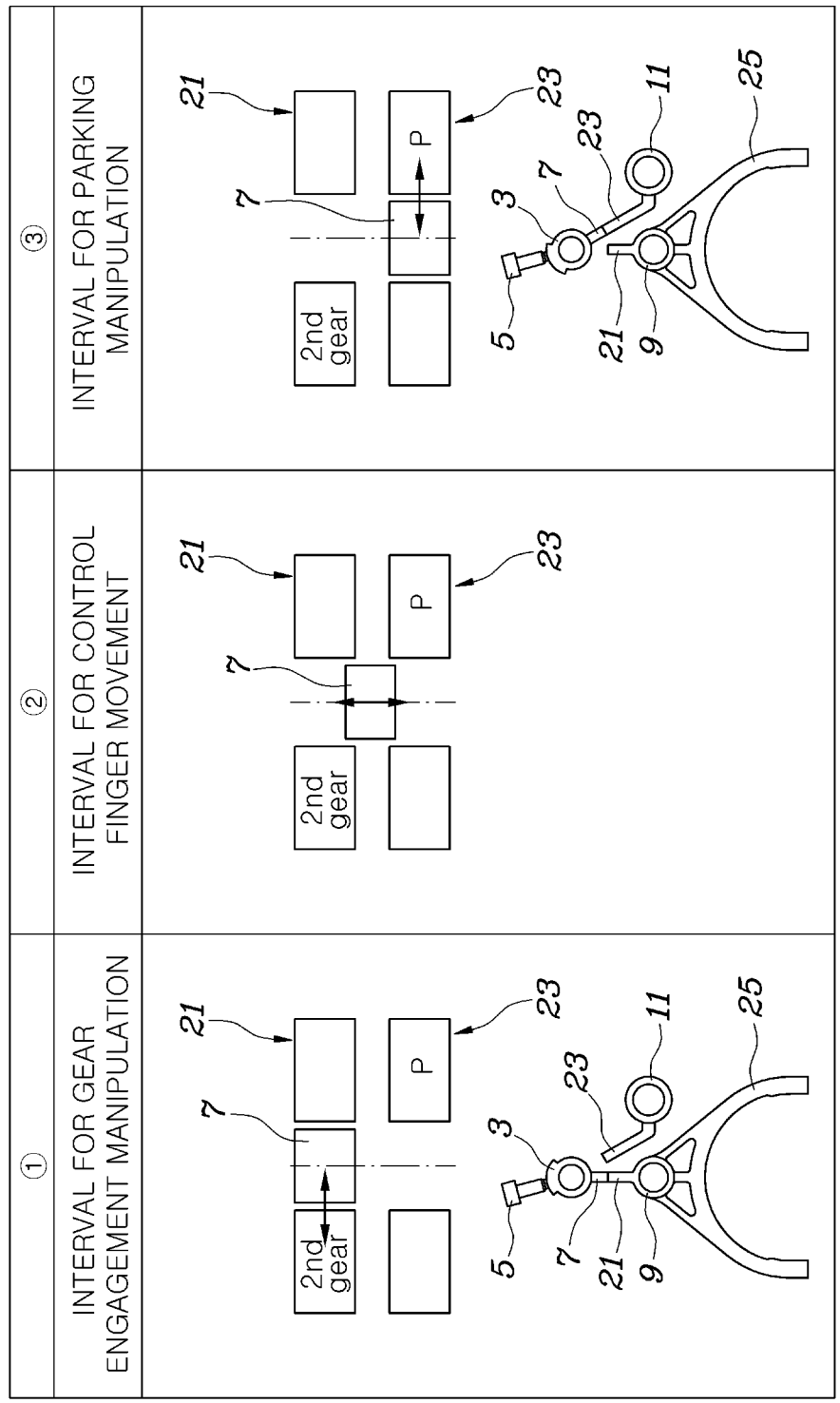
FIG. 3 is a graphic chart illustrating the operation of the shifting actuator according to one form of present disclosure.

Referring to FIGS. 1 to 3, a shifting actuator according to one form of the present disclosure includes a rotatable screw shaft 1, a screw nut 3, which is threadedly engaged with the screw shaft 1 so as to be linearly movable along the screw shaft 1, a guide for guiding the movement of the screw nut 3, a control finger 7, which is integrally formed with the screw nut 3, and a first slider 9 and a second slider 11, which are disposed so as to be parallel to each other and adapted to be selected by the control finger 7 so as to be linearly slidable in an axial direction parallel to the longitudinal direction of the screw shaft 1.

The screw nut 30 is provided with a guide hole 15 in which the guide 5 is disposed, and the guide hole 15 defines two linear zones 13 which are spaced apart from each other and parallel to each other.

Specifically, the shifting actuator according to the form of the present disclosure is operated as follows. When the screw shaft is rotated, the screw nut 3 is moved while being guided by the cooperation of the guide hole 15 and the guide 5. At this time, the control finger 7 moves the first slider 9 and the second slider 11 in an independent manner so as to enable a device connected to the first slider 9 or a device connected to the second slider 11 to move linearly.

One motor 17 is connected to one end of the screw shaft 1 so as to apply rotating force thereto. Hence, when the motor 17 is activated, the control finger 7 may be shifted by itself between a state of driving the first slider 9 and a state of driving the second slider 11. Consequently, it is possible to provide linear movement for manipulating the device connected to the first slider 9 and the device connected to the second slider 11 independently of each other using a minimal number of components.

In one form, the two linear zones 13 of the guide hole 15 formed in the screw nut 3 are out of alignment with each other in the axial direction, and are connected to each other at adjacent ends thereof via a connecting zone 19.

As illustrated in FIG. 2, the connecting zone 19 is perpendicularly connected to the adjacent ends of the two linear zones 13. The two linear zones 13 and the connecting zone 19 of the guide hole 15 are configured to have a single continuous line shape having the same width such that, when the screw nut 3 is moved relative to the guide 5 in the state in which the guide 5 is disposed in the guide hole 15, the movement of the screw nut 3 is guided by the guide 5.

Accordingly, as the screw shaft 1 is rotated in one direction, one linear zone 13 of the guide hole 15 is guided and linearly moved by the guide 5, and thus the screw nut 3 is linearly moved. When the guide 5 reaches the connecting zone 19, the connecting zone 19 is guided and rotated by the guide 5 in a direction such that the connecting zone 19 is not constricted by the guide 5, and the other linear zone 13 of the guide hole 15 is then guided and linearly moved by the guide 5. Meanwhile, when the screw shaft 1 is rotated in the opposite direction, the screw nut 3 performs a linear movement, a rotating movement and a linear movement in that order along the path opposite to the above-mentioned path.

The guide 5 may be composed of a reamer bolt or the like, which is fixed to a transmission case or the like.

The first slider 9 is integrally provided with a first lug 21, and the second slider 11 is integrally provided with a second lug 23. Since the connecting zone 19 of the guide hole 15 is guided by the guide 5, as the screw nut 3 is rotated, the control finger 7 may be shifted between the state in which the control finger 7 is engaged with the first lug 21 and the state in which the control finger 7 is engaged with the second lug 23.

Accordingly, when viewed in FIG. 2, when the upper linear zone 13 is guided by the guide 5 and thus the screw nut 3 is linearly moved, the control finger 7 is engaged with the first lug 21 and thus linearly moves the first slider 9 in the axial direction. When viewed in FIG. 2, when the lower linear zone 13 is guided by the guide 5 and thus the screw nut 3 is linearly moved, the control finger 7 is engaged with the second lug 23 and thus linearly moves the second slider 11 in the axial direction. When the connecting zone 19 of the guide hole 15 in the screw nut 3 is guided by the guide 5, the control finger 7 is moved between the first lug 21 and the second lug 23 while the screw nut 3 is rotated.

The first slider 9 and the second slider 11 may be respectively connected to devices that are actuated by linear movement applied thereto. In this form, the first slider 9 is connected to a shift fork 25 for shifting manipulation, and the second slider 11 is connected to a parking device 27 for realizing a parking function.

Consequently, as illustrated in FIG. 3, when the screw shaft 3 is linearly moved by rotation of the screw shaft 1 in the state in which the control finger 7 is engaged with the first lug 21, the shift fork 25 adapted to fulfill engagement with a $2^{nd}$ gear is moved so as to perform engagement with the $2^{nd}$ gear and release from the $2^{nd}$ gear.

When the guide 5 is positioned in the connecting zone 19 of the guide hole 15 by rotation of the screw shaft 1, the screw nut 3 is rotated while the connecting zone 19 is guided by the guide 5, and thus the control finger 7 is shifted to the second lug 23 from the first lug 21.

As the screw shaft 1 is further rotated in the same direction, the control finger 7 moves the second lug 23 and thus actuates the parking device 27 connected to the second lug 23, thereby shifting the transmission to the parked state.

For reference, ①, ② and ③ in FIG. 3 denote the upper linear zone, the connecting zone and the lower linear zone in FIG. 2, respectively.

Since the shifting actuator is capable of independently performing the shifting manipulation and the parking manipulation via the lugs, which are separated from each other, it is possible to structurally reduce or prevent malfunctions such as the simultaneous occurrence of the shifting manipulation and the parking manipulation.

Fore reference, FIG. 4A is a view illustrating a conventional shifting manipulation mechanism, and FIG. 4B is a view illustrating the parking device manipulation mechanism with the shifting actuator according to one form the present disclosure.

Specifically, as illustrated in FIG. 4A, the conventional shifting manipulation mechanism includes a $1^{st}$-$3^{rd}$-gear shifting lug 29, which is constructed so as to cause the transmission to be shifted between the $1^{st}$ gear and the $3^{rd}$ gear, a $2^{nd}$ gear shifting lug 31 for causing the transmission to be shifted to the $2^{nd}$ gear, a $1^{st}$-$3^{rd}$-gear control finger 35 for linearly moving the $1^{st}$-$3^{rd}$-gear shifting lug 29 and a $2^{nd}$ gear control finger 35 for linearly moving the $2^{nd}$ gear shifting lug 31. Hence, a motor for driving the $1^{st}$-$3^{rd}$-gear control finger 33 and a motor for driving the $2^{nd}$ gear control finger 35 have to be additionally provided, and an additional motor for moving a parking lug 36 adapted to drive the parking device 27 and a parking control finger 37 have to be additionally provided.

In contrast, although the shifting actuator according to the present disclosure is additionally provided with the $1^{st}$-$3^{rd}$-gear control finger 33 for moving the $1^{st}$-$3^{rd}$-gear shifting lug 29 and the associated motor, the $2^{nd}$ gear control finger 35 and the parking control finger 37 are incorporated into the single control finger 7 in FIG. 4B, and the control finger 7 is driven by a single motor 17. Consequently, since the shifting manipulation and the parking manipulation are performed using a smaller number of components, it is possible to construct a more compact transmission.

As is apparent from the above description, since the present disclosure makes it possible to construct a transmission having a more simple and compact structure, it is possible to improve fuel efficiency and electric efficiency of a vehicle and also to improve the merchantability by reduction of cost thereof.

Furthermore, it is possible to fulfill functions of shifting manipulation and manipulation of a parking device using a single drive source.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A shifting actuator for a transmission, comprising:
   a rotatable screw shaft;
   a screw nut configured to threadedly engage the screw shaft and linearly move along the rotatable screw shaft;
   a guide configured to guide the screw nut;
   a control finger integrally formed with the screw nut; and
   a first slider and a second slider disposed parallel to each other, wherein the first and second sliders are adapted to be selected by the control finger so as to linearly slide in an axial direction parallel to a longitudinal direction of the rotatable screw shaft,
   wherein the screw nut is provided with a guide hole in which the guide is disposed, and the guide hole defines two linear zones spaced apart from each other and parallel to each other.

2. The shifting actuator according to claim 1, wherein the two linear zones of the guide hole are out of alignment with each other in the axial direction and are connected to each other at adjacent ends thereof via a connecting zone.

3. The shifting actuator according to claim 2, wherein the connecting zone is perpendicularly connected to the adjacent ends of the two linear zones, and the two linear zones and the connecting zone of the guide hole are configured to form a single continuous line shape having a same width such that, when the screw nut is moved relative to the guide in a state where the guide is disposed in the guide hole, the screw nut is guided by the guide.

4. The shifting actuator according to claim 2, wherein the first slider is integrally provided with a first lug, and the second slider is integrally provided with a second lug, and wherein, since the connecting zone of the guide hole is guided by the guide, as the screw nut is rotated, the control finger is shifted between a first state in which the control finger is engaged with the first lug and a second state in which the control finger is engaged with the second lug.

5. The shifting actuator according to claim 1, wherein the rotatable screw shaft is connected at one end thereof to a motor so as to receive a rotating force therefrom.

6. The shifting actuator according to claim 1, wherein the first slider is connected to a shift fork for shifting manipulation, and the second slider is connected to a parking device for realizing a parking function.

* * * * *